US006547649B1

(12) United States Patent
Andrus

(10) Patent No.: US 6,547,649 B1

(45) Date of Patent: Apr. 15, 2003

(54) SYSTEM AND METHOD FOR RECOVERING METALS FROM SCRAP GENERATED DURING DENTAL AND JEWELRY MANUFACTURING

(76) Inventor: David J. Andrus, 13760 W. 67th Cir., Arvada, CO (US) 80004

( * ) Notice: Subject to any disclaimer, the term of this patent is extended or adjusted under 35 U.S.C. 154(b) by 0 days.

(21) Appl. No.: 09/990,018

(22) Filed: Nov. 21, 2001

(51) Int. Cl.[7] .................................................. B24B 1/00

(52) U.S. Cl. ............................ 451/54; 451/87; 451/88; 451/451; 209/3; 209/214; 209/215

(58) Field of Search ............................ 451/54, 87, 88, 451/451, 453; 209/3, 215, 214

(56) References Cited

U.S. PATENT DOCUMENTS 5,071,541 A * 12/1991 Thompson
6,159,086 A * 12/2000 McClurkin

* cited by examiner

*Primary Examiner*—Joseph J. Hail, III
*Assistant Examiner*—Willie Berry, Jr.
(74) *Attorney, Agent, or Firm*—Baniak Pine & Gannon

(57) ABSTRACT

A method for recovering noble metal from scrap generated during the manufacture of noble metal units. The method includes providing a cast metal unit such as a dental crown or a jewelry item. The unit is made of some noble metal. The surface of the unit is prepared with an abrading element. A magnetically attractive particulate contaminated scrap is generated. The scrap includes some noble metal and particulate contaminate. The noble metal is magnetically separated from the contaminate. The system includes an abrading element and a rotary tool for operating the element at a speed sufficient to prepare the surface of the units. A collection unit is provided for operation of the element therein. The scrap generated includes a percentage of magnetically attractive contaminate. A refining unit is provided including a magnet positioned therein for magnetically removing the contaminate from the scrap.

16 Claims, 2 Drawing Sheets

SYSTEM AND METHOD FOR RECOVERING METALS FROM SCRAP GENERATED DURING DENTAL AND JEWELRY MANUFACTURING

FIELD OF THE INVENTION

The present invention relates to the field of dental restorations and more particularly to the preparation of dental crowns with a system and method that easily separates contaminates from precious metal scrap generated in the making of the crowns and facilitates a high rate of recovery thereof. The present invention is also useful in the jewelry and like industries where noble and high noble metal items are made.

BACKGROUND OF THE INVENTION

The most prevalent crown construction for dental restorations is the porcelain veneered cast metal crown and full contour metal crowns. The cast metal crown is fabricated using a relatively thin metal understructure formed from casting noble and high noble metals into an investment mold of a wax or plastic pattern of the metal understructure or full contour crown. Dental porcelain is then applied in layers over part or all of the understructure and fired at high temperature to form a veneer layer. The metal understructure may be formed from a base ally (non-precious) noble based metal or a noble based alloy with varying quantities of gold, platinum, palladium, silver, nickel, and an array of "trace elements".

The crown typically is made in a process where a model or pattern of the patient's teeth is made. The pattern of the crown is made of out of wax. The pattern is sprued, invested, burned out and a metal casting is made therefrom in the classic lost wax technique. Each metal unit is cut off from the base (or button) with a disk, typically made of carborundum. The button is saved and reused. The scrap, from grinding or cutting and typically collected by vacuum, is not readily reusable and is saved for processing at an off-site refiner. Unusable, contaminated scrap is generated at most or all the subsequent steps as well. For example, scrap is generated when the units are separated from the sprues. Scrap is generated when the inside and outside surfaces of the units are prepared with stones. The scrap contains at least contaminates from the stone cutting and surface preparation devices. Significantly, the expense of sending the scrap to be processed by an outside refiner yields a low rate of recovery of the value of the material, on the order of about sixty percent.

Similar disadvantages exist in the jewelry industry, where lost wax casting techniques, and the like, are employed to make small precious metal items.

It would be beneficial to provide an improved method and system for preparing crown understructures and full contour crowns that overcomes these disadvantages.

SUMMARY OF THE INVENTION

One aspect of the present invention provides a method for recovering noble and high noble metal from scrap generated during the manufacture of noble and high noble metal units including providing a cast metal unit. The unit is made of at least some noble metal. The surface of the unit is prepared with an abrading element. The preparing step further includes generating a magnetically attractive particulate contaminate and generating an amount of scrap thereby. The scrap includes noble metal and a percentage of particulate contaminate. The noble metal is magnetically separated from the contaminate.

Another aspect of the method of the present provides a casting button and sprue. The method further includes removing the button from the unit and removing the sprue from the unit with the abrading element before surface preparation of the unit, generating an additional amount of scrap thereby; and combining the generated amounts of scrap before magnetic separation thereof.

The unit may be a dental crown understructure. The unit may be a jewelry item. The abrading element may be a tungsten carbide bur operated at a speed of about 10,000 to about 300,000 RPM. The bur may be operated at about 40,000 RPM. The step of preparing the surface of the unit may take place in a substantially closed housing. The step of magnetically separating the noble metal may include transferring the scrap into a refining jar, wherein the refining jar comprises a magnet, and agitating the scrap therein.

Another aspect of the present invention provides a system for preparing noble metal units and recovering noble metal from scrap generated during the manufacture thereof, including at least one abrading element and means for operating the bur at a speed sufficient to prepare the surface of the units. A substantially closed collection unit is provided for operation of the at least one bur therein, for collecting scrap generated during preparation of the unit by the bur, wherein the scrap includes a percentage of magnetically attractive contaminate. A refining unit is provided including a magnet positioned therein for magnetically removing the tungsten carbide contaminate from the scrap.

Other aspects of the system of the present invention provide a collection unit that may include a housing, at least a portion of the housing being transparent. The housing may include a metallic portion. The housing may include left and right sides, at least one of which includes a tool port formed therein through which a tool may be inserted therethrough. Each of the left and right sides may include an opening into which a plate is rotatably positioned, each of the plates including an orifice formed therein through which a hand may be inserted therethrough. Each orifice may be eccentrically formed in each plate. The refining unit may include a glass portion and a lid portion, the lid portion being releasably positioned to close the glass portion. The magnet may be a rare earth magnet. The magnet may be affixed to the lid for positioning within the glass portion of the refining unit.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

BRIEF DESCRIPTION OF THE DRAWINGS

The above-mentioned and other features and advantages of this invention, and the manner of attaining them, will be further understood by reference to the following description of an embodiment of the invention taken in conjunction with the accompanying drawings, wherein.

DETAILED DESCRIPTION OF A PRESENTLY PREFERRED EMBODIMENT

In broad overview, the present invention relates to a system and method of preparing precious metal items, like dental crown understructures and full contour metal crowns, with respect to recovering noble and high noble material from scrap or waste generated in the making of the items. As used herein, the noble material or metal referred to specifically is gold, silver, platinum and palladium or an alloy thereof used in making the desired unit, such as a crown understructure or full contour metal crown. For purposes of the present description, reference to noble metal will include high noble metal materials. The noble material is non-magnetic. The term scrap, as used herein, will refer to a noble material that has been contaminated with other materials. Some or all of the contaminate is magnetic and is thus capable of being magnetically separated from the noble metal by exposure to a magnetic field, from for example a magnet. It will be understood that the embodiments of the present invention illustrated herein are scaled to be cost effective when used by a small or limited sized laboratory or business. Other systems are contemplated in view of the teachings below, which may be applied to larger facilities by providing numerous such systems or applying the same principles to larger or automated apparatuses.

Figure 1:
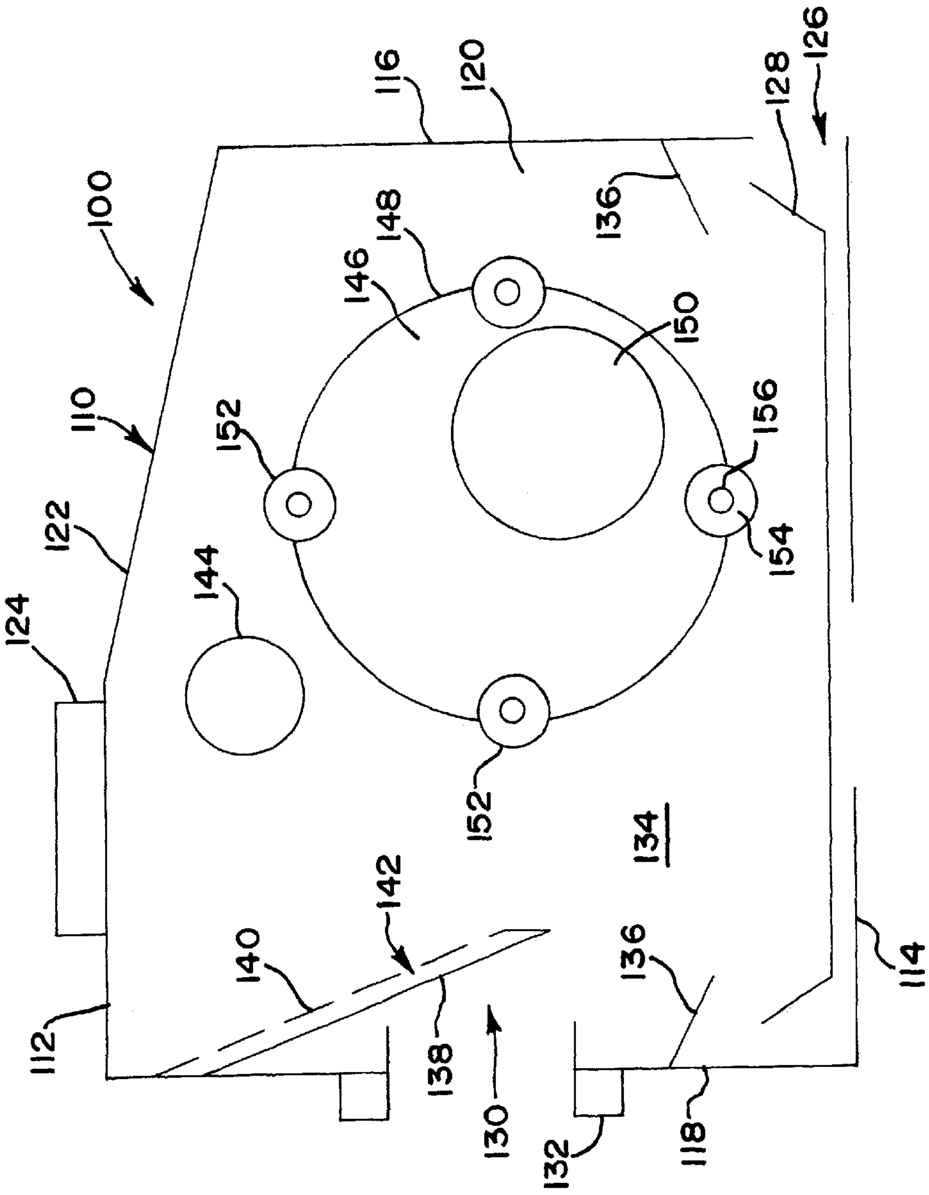
FIG. 1 shows a side view of one aspect of an embodiment of the present invention, and in particular, a collection device.

Beginning with the invention shown in FIG. 1, a collection unit or box is illustrated generally at 100. The collection box 100 includes a housing portion 110, which in one embodiment may be made of a clear Plexiglas material, or other suitable material. In another embodiment, the housing 110 may be made of a metal material. It may be preferable to construct the housing 110 of a material that is not capable of retaining static electricity. The collection box 100 is used to collect the scrap material, typically in the form of fine shavings, filings and dust and the like during the process of manufacturing a cast unit into a finished product. Manufacturing includes applying a tungsten carbide bur to the unit and the scrap thus generated is retained in the unit 100.

The housing portion 110 includes top and bottom portions 112, 114 and four sides. In one embodiment, the housing 110 is about a foot square. The front and back side 116, 118 and one example of a left side 120 being shown. The top 112 of the housing portion 110 may include a removable clear plastic viewing panel 122 through which the technician may easily observe the operation. The top 112 of the housing portion 110 may further include a handle 124 for transporting the unit 100. Further, the top 112 of the housing portion 110 may include a bracket (not shown) for stacking a number of identical or similar units 100. The housing portion 110 may include a slot 126 formed along a bottom area of one of the sides, such as the front side 116, for inserting and removing a collection pan 128. During use of the unit 100 the collection pan 128 is normally positioned along the bottom of the unit 100 positioned to catch any materials generated inside the unit. The pan 128 is preferably a material with non-static properties, such as stainless steel in order to not statically retain any of the scrap material.

A back side 118 of the unit 100 may include a port 130 with an attaching portion 132, which is provided for attaching a vacuum hose (not shown) thereto in a conventional manner, by interference fit or threaded connection, for example. The port 130 opens to the interior 134 of the housing 110. The interior 134 of the housing 110 may preferably include an angled skirt 136 formed around the periphery thereof, which directs any materials generated inside to the collecting pan 128 residing at the bottom of the interior of the housing. Further, a downward angled member 138 may be provided in the interior of the housing 110, which extends over the port opening 130 to deflect any materials away from the port. The top surface 140 of the angled member 138 may include a plurality of openings 142 formed therein for inserting and storing various tools such as carbide burs or similar tools and tool bits (not shown). The openings 142 are sized to receive the shaft of each bur.

The left and right sides of the housing 110 are similar, and thus, only one will be discussed herein. One or more tool ports 144 may be provided, through which a drill (high or low speed), or similar tool may be inserted. The one or more tool ports 144 may be sealed by a cap member or plug (not shown).

Each of the left and right sides of the housing 110 may be provided with a circular plate 146, which is held in place in a suitable opening 148 formed in each side. The opening 148 and plate 149 may be any suitable compatible shape, such as rectangular, hexagonal and so on. Each circular plate 146 contains an orifice 150, which may be eccentrically positioned relative to the center of the plate 146, through which the technician may insert a hand. The orifice may be about four inches in diameter, or sized to receive a technician's hand and wrist. Furthermore, the orifice 150 may be provided with an annular sleeve (not shown) to reduce loss of generated scrap through the orifice. In another embodiment of the invention, the orifice may be provided with a sealed glove or sleeve (not shown) to further enclose or seal the housing 110 from loss of scrap.

In the illustrated embodiment shown, a number of retaining devices 152 are provided to hold the circular plates 146 in the openings 148. Retaining devices 152 may be a pair of spaced washers 154 held together by a screw 156 or suitable fastener. Loosening the retaining devices 152 permits the circular plate 146 to rotate in the opening 148. Tightening the retainers 152 fix the plate 146 in position. In this manner, the orifice 150 can be adjusted as to height and front to back positioning and thus permit the user to adapt the unit to each user and to different working conditions. Use of the collecting box unit 100 will be explained more fully below with reference to FIG. 3.

Figure 2:
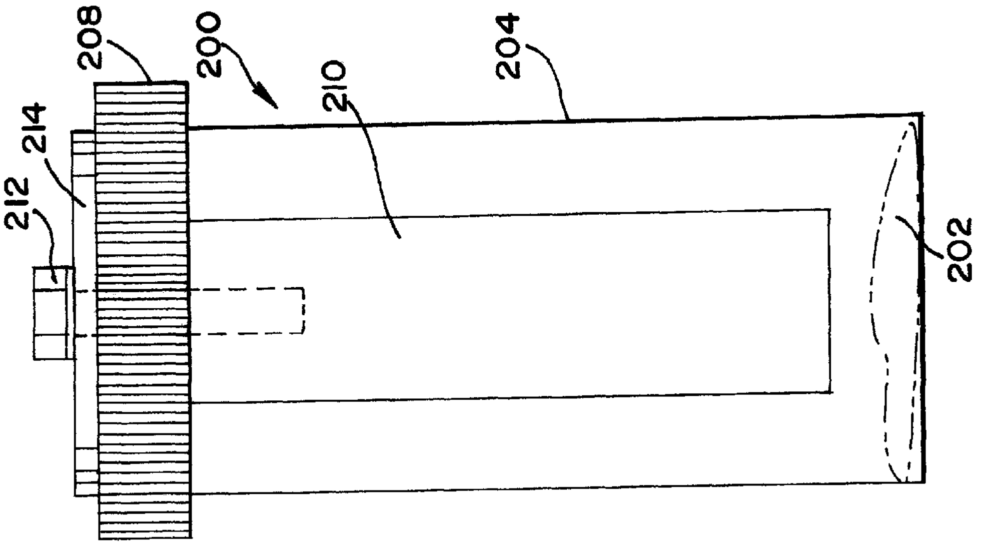
FIG. 2 shows a side view of another aspect of an embodiment of the present invention, and in particular, a refining vessel.

As shown in FIG. 2, the refining vessel is shown generally at 200. As will be explained more fully below, scrap material 202 obtained from the unit 100 described in FIG. 1 is transferred to the refining unit 200 and separated magnetically. The refining unit 200 includes glass container 204, which is sealed by a lid 208, after the scrap 200 is placed inside. In one embodiment, the glass container 204 may be about six inches in length and about two inches in diameter. The container 200 may be an eight-ounce container. A magnet 210 is centrally positioned inside the glass container 204. A fastener 212 may be used to fix the magnet 210 to the inside surface of the lid 208. A large diameter washer 214 may be used to stabilize the magnet 210 with respect to the lid 208 due to the large mass of the magnet 210.

The magnet 210 may be a rare earth magnet. It will be appreciated that a strong magnet is preferred and that any suitable magnet may be used with magnetic properties sufficient to separate magnetic material from non-magnetic material. The magnet 210 may be a single large magnet or a plurality of spaced magnets, preferably housed in a single casing. The surface of the magnet should be finished such that magnetic particles adhering thereon can be easily seen. It has been found that a sand blasted finish is preferable to that end.

Figure 3:
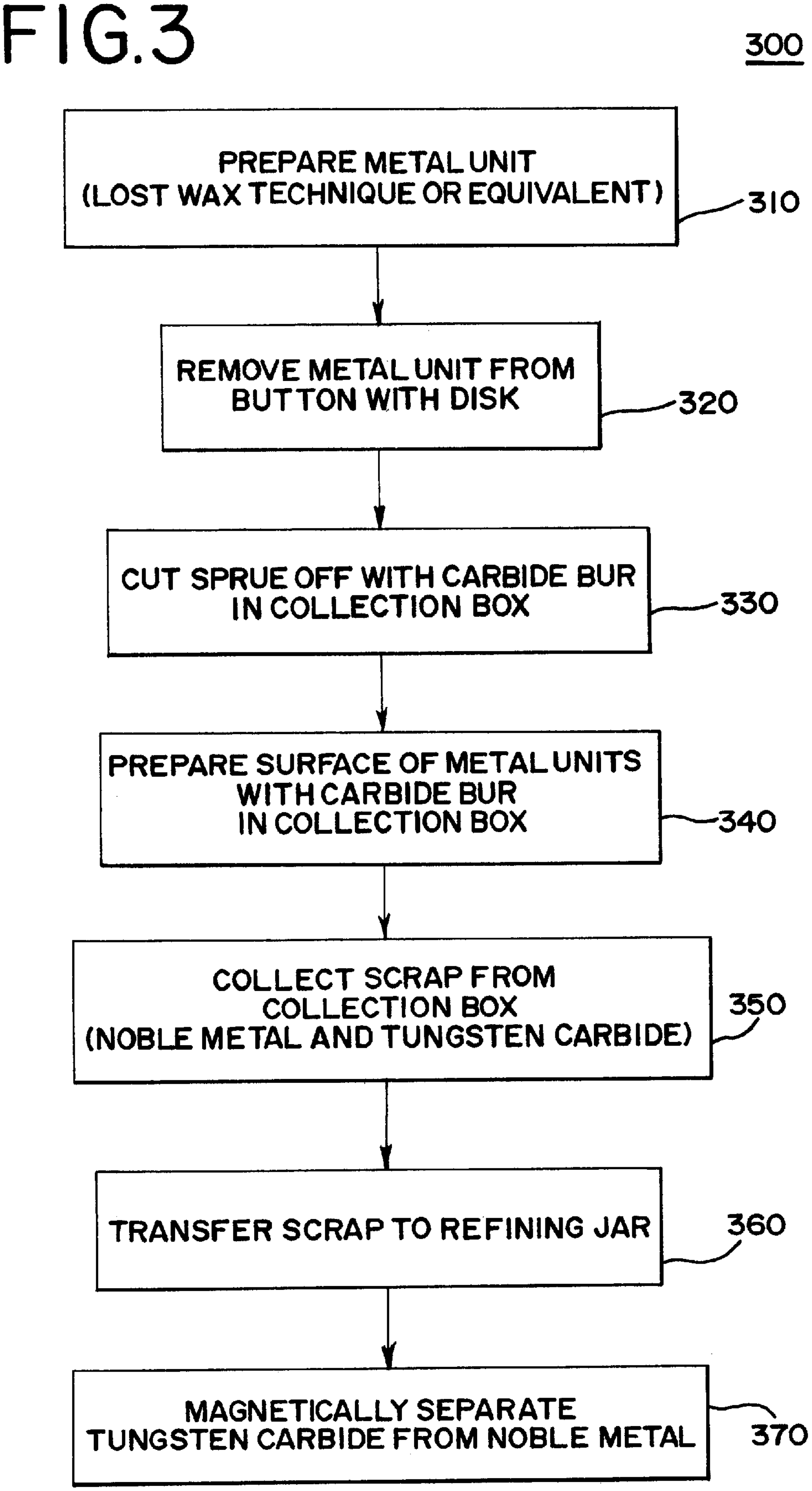
FIG. 3 shows a flow chart of one embodiment of the method of the present invention.

FIG. 3 is a flowchart 300 generally illustrating one embodiment of the method of the present invention.

The process 300 may begin with block 310, wherein a desired unit is prepared by casting using a conventional lost wax or equivalent technique. The unit may be a metal understructure for a crown, full contour metal crown or a piece of jewelry, or the like, made of gold alloy, for example, or including any suitable noble metal material.

The metal unit is removed from the casting button (block 320) with a cutting disk. The disk is typically a stone, like carborundum, which is turned at a relatively slow speed in a tool, i.e. a drill or "laith". The button material is saved and may be reused, as it will typically contain little or no contamination from the disk. The scrap from the cutting operation is collected, by vacuum, for example, and due to being contaminated by material from the carborundum disk, is not reusable without refining as has been done conventionally outside the dental laboratory.

The remaining metal sprue is cut off of the metal unit (which will be eventually cemented in the mouth, for example)(block 330) with a tungsten carbide bur inside the collection box 100. The bur may preferably be turned at a speed, for instance, on the order of about from 10,000 to 300,000 revolutions per minute (RPM). Due to the speed of the bur, it is advantageous to perform the sprue-removing operation in the collection box 100 of the present system. Use of the collection box 100 thus reduces or eliminates loss of the scrap material generated by scattering by rotation of the bur. The collection box 100 may be provided with a low volume vacuum to reduce humidity build up from the technician's hands. In order to prevent the vacuuming of the metal filings, it will be appreciated that the vacuum should not be applied at a rate that will prevent the metal alloy from landing in the collection pan 128 in the bottom of the box. Similarly, it can be seen that use of the deflector 138 between the vacuum orifice 130 and the box interior 134 during the operation will be advantageous in this and subsequent steps.

All of the subsequent seating and surface preparation steps (block 340) are also preferably performed in the collection box 100 with a carbide bur. In a presently preferred embodiment all or almost all (about ninety-eight percent) of the surface preparation can be done with such a bur. During this operation, all of the scrap material collected in the collection box 100 can be reused after refining in the inventive refining device 200.

The scrap 202 thus generated includes a major portion of noble metal and a minor portion of tungsten carbide bur contaminant. The scrap 202 is collected (block 350) and transferred to the refining device 200 (block 360).

A minor portion (about two percent) of the finishing or surface preparation of the unit may be done with a conventional stone. The scrap material from this portion of the operation must be collected separately from the scrap containing tungsten carbide and must be refined conventionally.

It will be appreciated that tungsten carbide is magnetic and the noble metal is not. As set out above, the refining jar 200 includes a magnet 210. It has been found that due to the moderate magnetic properties of the tungsten carbide, a magnet with strong magnetic properties is preferable for efficient magnetic separation of the carbide and the noble metal or high noble metal. Thus, in one embodiment of the present invention a rare earth magnet is preferred. It will be appreciated that other magnets may be suitable for separation purposes, such as an electromagnet or ceramic magnet.

Scrap material 202 including tungsten carbide contaminant from the above steps is transferred to the refining device or jar 200 and separated therein (block 370). In one embodiment, the jar is agitated for a period of time, manually or with the aid of an agitation device, which may hold the jar 200, for example, a period of time of one minute, ensuring that the scrap is evenly exposed to the magnet 210. The jar 200 is opened after agitation and the lid 208 and magnet 210 assemblies are lifted off of the glass jar 204. The carbide particles may be removed by wiping the magnet with an alcohol-soaked wipe. The alcohol is preferable to water, for example, due to the fact that alcohol evaporates relatively quickly. The wipe can be any suitable wipe, for example of cloth or paper. The carbide contaminant is removed from the magnet 210 with the wipe. After the magnet is dry, the magnet and lid assembly can be placed onto the jar containing the scrap and the agitation step repeated until no carbide particles are removed from the remaining material.

The remaining material can be melted and checked for purity as is conventional. The technician can then reuse the refined material immediately.

It should be appreciated that the embodiments described above are to be considered in all respects only illustrative and not restrictive. The scope of the invention is indicated by the following claims rather than by the foregoing description. All changes that come within the meaning and range of equivalents are to be embraced within their scope.

What is claimed is:

1. A method for recovering noble metal from scrap generated during manufacture of noble metal units comprising the steps of:

providing a cast metal unit, the cast metal unit being made of at least some noble metal;

preparing one or more surfaces of the cast metal unit with a tungsten carbide abrading element operated at a speed of about 10,000 to about 300,000 RPM;

generating an amount of scrap during the preparation of the one or more surfaces, wherein the scrap includes noble metal from the cast metal unit and a percentage of magnetically attractive particulate contaminate from the abrading element; and separating the scrap by magnetically removing the magnetically attractive particulate contaminate from the noble metal.

2. The method of claim 1 wherein the cast metal unit includes a casting button and sprue, further comprising:

removing the button from the cast metal unit;

removing the sprue from the cast metal unit with the abrading element before surface preparation of the cast metal unit;

generating an additional amount of scrap thereby; and combining the generated amounts of scrap before separation thereof.

3. The method of claim 1 wherein the cast metal unit is a dental crown understructure.

4. The method of claim 1 wherein the cast metal unit is a jewelry item.

5. The method of claim 1 wherein the abrading element is operated at about 40,000 RPM.

6. The method of claim 1 wherein the step of preparing the surface of the cast metal unit takes place in a substantially closed housing.

7. The method of claim 1 wherein the step of magnetically separating the scrap includes transferring the scrap into a refining jar, wherein the refining jar comprises a magnet, and agitating the scrap therein.

8. A system for preparing noble metal units and recovering noble metal from scrap generated during manufacture thereof, comprising:

at least one abrading element having a magnetically attractive component and means for operating the abrading element at a speed sufficient to prepare a surface of the noble metal units;

a substantially closed collection unit for operation of the abrading element therein, for collecting scrap generated during preparation of the noble metal units by the abrading element, wherein the scrap includes noble metal originating from the noble metal units and a percentage of magnetically attractive contaminate originating from the abrading element; and a refining unit including a magnet positioned therein for magnetically removing the magnetically attractive contaminate from the scrap.

9. The system of claim 8 wherein the collection unit includes a housing, at least a portion of the housing being transparent.

10. The system of claim 9 wherein the housing includes a metallic portion.

11. The system of claim 9 wherein the housing includes left and right sides, at least one of which includes a tool port formed therein through which a tool may be inserted therethrough.

12. The system of claim 11 wherein each of the left and right sides includes an opening into which a plate is rotatably positioned, each of the plates including an orifice formed therein through which a hand may be inserted therethrough.

13. The system of claim 12 wherein each orifice is eccentrically formed in each plate.

14. The system of claim 8 wherein the refining unit includes a glass portion and a lid portion, the lid portion being releasably positioned to close the glass portion.

15. The system of claim 8 wherein the magnet is a rare earth magnet.

16. The system of claim 14 wherein the magnet is affixed to the lid for positioning within the glass portion of the refining unit.

* * * * *